United States Patent
Mathews et al.

(10) Patent No.: US 6,754,788 B2
(45) Date of Patent: Jun. 22, 2004

(54) APPARATUS, METHOD AND COMPUTER PROGRAM PRODUCT FOR PRIVATIZING OPERATING SYSTEM DATA

(75) Inventors: Thomas Stanley Mathews, Austin, TX (US); Jonathan Allen Wildstrom, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 09/810,034

(22) Filed: Mar. 15, 2001

(65) Prior Publication Data

US 2002/0133678 A1 Sep. 19, 2002

(51) Int. Cl.[7] .............................................. G06F 12/00
(52) U.S. Cl. ....................... 711/153; 711/171; 711/173
(58) Field of Search ................................ 711/148, 153, 711/173, 171

(56) References Cited

U.S. PATENT DOCUMENTS

| | | | | |
|---|---|---|---|---|
| 5,117,350 A | * | 5/1992 | Parrish et al. .................. | 711/1 |
| 5,237,673 A | * | 8/1993 | Orbits et al. ................ | 711/170 |
| 5,388,242 A | * | 2/1995 | Jewett ......................... | 711/113 |
| 5,473,770 A | * | 12/1995 | Vrba ........................... | 711/106 |
| 5,564,008 A | * | 10/1996 | Foster ......................... | 345/520 |
| 5,684,993 A | * | 11/1997 | Willman ...................... | 709/107 |
| 5,812,852 A | * | 9/1998 | Poulsen et al. .............. | 717/149 |
| 5,940,870 A | * | 8/1999 | Chi et al. .................... | 711/206 |
| 6,058,460 A | * | 5/2000 | Nakhimovsky .............. | 711/153 |
| 6,360,303 B1 | * | 3/2002 | Wisler et al. ................ | 711/152 |
| 6,480,941 B1 | * | 11/2002 | Franke et al. ................ | 711/153 |
| 2001/0025363 A1 | * | 9/2001 | Ussery et al. .................. | 716/1 |

* cited by examiner

Primary Examiner—Hiep T. Nguyen
(74) Attorney, Agent, or Firm—Duke W. Yee; Volel Emile; Stephen J. Walder, Jr.

(57) ABSTRACT

The present invention provides an apparatus, method and computer program product for privatizing operating system data. With the apparatus, method and computer program product of the present invention, a block of memory is allocated and divided into identical, smaller, properly aligned storage areas, each dedicated to a single processor in a multiprocessor system. The storage areas are allocated either initially when the system is initialized or on an as needed basis. Each sub-allocation request is made to use storage at the same location relative to the start of that processor's storage space. Because each processor's storage is isomorphic to all other processors, only one allocation record for all processors is needed, thereby reducing the overhead of the data privatization scheme. By allocating memory in this manner, cache line contention is minimized.

40 Claims, 3 Drawing Sheets

APPARATUS, METHOD AND COMPUTER PROGRAM PRODUCT FOR PRIVATIZING OPERATING SYSTEM DATA

BACKGROUND OF THE INVENTION

1. Technical Field

The present invention is directed to an apparatus, method, and computer program product for privatizing operating system data.

2. Description of Related Art

Data privatization is a known software technique used in shared-memory multiprocessor (SMMP) hardware systems. Data privatization involves storing data that is only needed by a particular processor in a specific cache line for that processor in the shared cache memory. A cache line is a portion of the processor's cache that represents a section of physical memory of the same size. In order for other processors to access the privatized data in the shared cache memory, the other processors must explicitly reference the memory where the privatized data is stored.

Data privatization allows SMMP hardware systems to avoid coherency misses in hardware caches. When a cache line is written to, it becomes the only valid copy of that memory. As a result, all other copies of that cache line must be invalidated. A cache miss is when memory must be read from slower system memory (RAM) into the faster access cache, due to the cache line containing other data. These cache misses are caused by read/write sharing of data among processors where one processor is writing to a cache address location while another processor is reading from the same cache address location. Such cache misses negativley impact the performance of the operating system software.

Data privatization has two main types of uses. First, data privatization is used with frequently modified operating system data that represents the states of each processor. This data is infrequently accessed by other processors and hence, is a good candidate for privatization. An example of this first use is data privatization being used with per-processor run queue data.

The second use of data privatization is with global state data that can be maintained on a per-processor basis. This data is infrequently needed on a system-wide basis and, because it is maintained on a per-processor basis, no processor's data will ever be written to by another processor. An example of such global state data is global statistics.

Under known data privatization techniques, a private copy of read/write data is maintained in separate cache lines for each processor. Each processor only modifies its own copy of the data, thus avoiding modifications to shared cache lines and cache coherency overhead.

On SMMP hardware systems with non-uniform memory access (NUMA), data privatization must also consider the distribution of physical memory pages. The locality of the physical memory will affect the performance cost of cache misses in cases where the data must be fetched into the hardware cache from physical memory. The performance cost of these cache misses is lowest when the private data is placed in physical memory pages that are local to the processor.

Data privatization must also consider the dynamic nature of the physical configurations of SMMP hardware systems. This must be considered because data is to be maintained on a per-processor basis in local memory for the processors of the hardware system and the physical configuration of the system may change dynamically as processors and/or memory are added to and removed from the hardware system as part of a physical reconfiguration operation.

Data privatization is widely applicable to many subsystems of operating system software, e.g., virtual memory manager, filesystems, security, etc. However, data privatization requires each area to have an understanding of the complexities of the physical characteristics, e.g., cache and page size, number of processors present, etc., physical topology, e.g., the physical distribution of memory, and dynamic nature of the hardware system on which it is utilized. In addition, each area must define its own methods of privatizing its data as no systematic facilities exist. Thus, it would be beneficial to have an apparatus, method and computer program product for providing a uniform privatization scheme to eliminate the need for multiple privatization schemes. Moreover, it would be beneficial to have a uniform privatization scheme in which the physical characteristics, physical topology and dynamic nature of hardware systems are taken into consideration.

SUMMARY OF THE INVENTION

The present invention provides an apparatus, method and computer program product for privatizing operating system data. With the apparatus, method and computer program product of the present invention, a block of memory is allocated and divided into identical, smaller, properly aligned storage areas, each dedicated to a single processor in a multiprocessor system. The storage areas are allocated either initially when the system is initialized or on an as needed basis.

Each sub-allocation request is made to use storage at the same location relative to the start of that processor's storage space. This allows for fast lookup. By having each sub-allocation at offset n and maintaining the address of the start of each processor's storage area, the address of a given processor's private data is merely <local address start>+n. Because each processor's storage is isomorphic to all other processors, only one allocation record for all processors is needed, thereby reducing the overhead of the data privatization scheme. By allocating memory in this manner, cache line contention is minimized.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
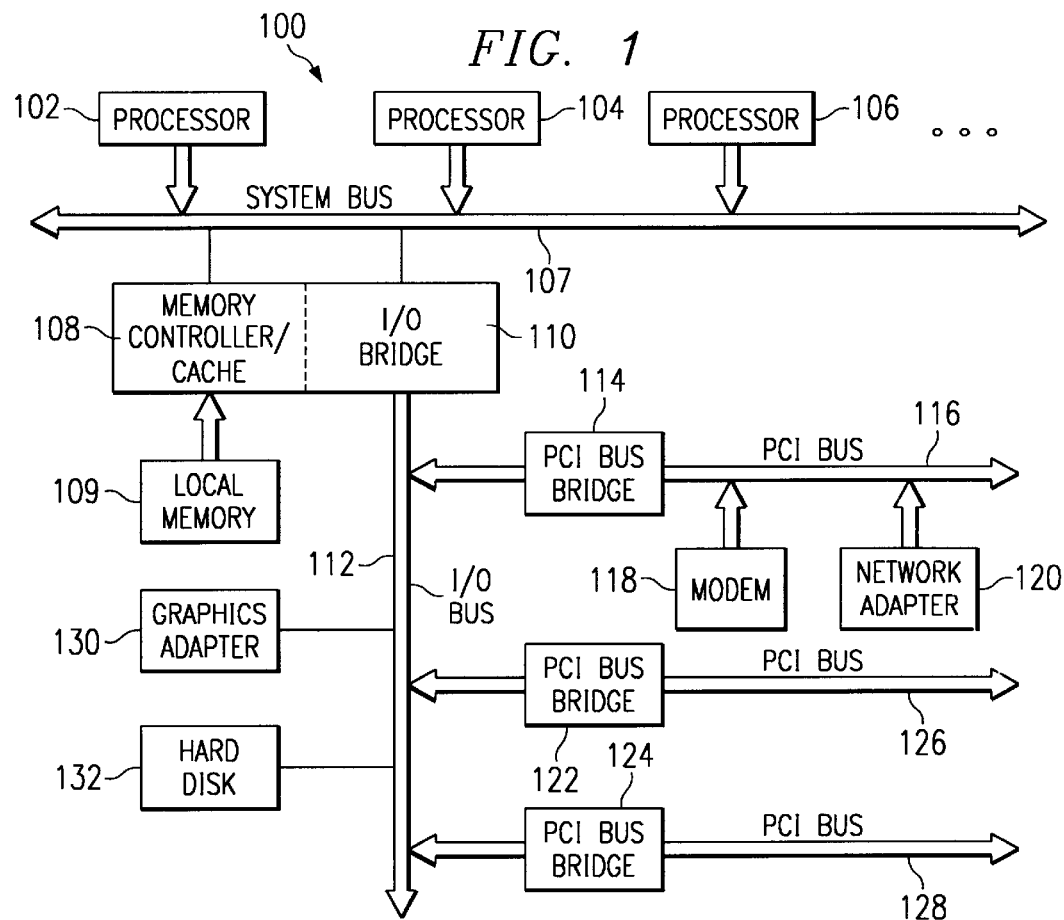
FIG. 1 is an exemplary block diagram of a data processing system in accordance with the present invention.

With reference now to the figures, FIG. 1 is a block diagram of a multiprocessor data processing system in which the present invention may be employed. As shown in FIG. 1, the data processing system 100 may be a shared memory multiprocessor (SMMP) system, a Non-Uniform Memory Access (NUMA) system, or other multiprocessor system that includes a plurality of processors 102–106 connected to system bus 107 and which share a system memory. Also connected to system bus 107 is memory controller/cache 108, which provides an interface to local memory 109. I/O bus bridge 110 is connected to system bus 107 and provides an interface to I/O bus 112. Memory controller/cache 108 and I/O bus bridge 110 may be integrated as depicted.

Peripheral component interconnect (PCI) bus bridge 114 connected to I/O bus 112 provides an interface to PCI local bus 116. A number of modems may be connected to PCI bus 116. Typical PCI bus implementations will support four PCI expansion slots or add-in connectors. Communications links to other devices, networks, and the like, may be provided through modem 118 and network adapter 120 connected to PCI local bus 116 through add-in boards.

Additional PCI bus bridges 122 and 124 provide interfaces for additional PCI buses 126 and 128, from which additional modems or network adapters may be supported. In this manner, data processing system 100 allows connections to multiple network computers. A memory-mapped graphics adapter 130 and hard disk 132 may also be connected to I/O bus 112 as depicted, either directly or indirectly.

Those of ordinary skill in the art will appreciate that the hardware depicted in FIG. 1 may vary. For example, other peripheral devices, such as optical disk drives and the like, also may be used in addition to or in place of the hardware depicted. Moreover, many of the elements shown in FIG. 1 may not be present in the data processing system in which the present invention is employed. The depicted example is not meant to imply architectural limitations with respect to the present invention.

The data processing system depicted in FIG. 1 may be, for example, an IBM RISC/System 6000 system, a product of International Business Machines Corporation in Armonk, N.Y., running the Advanced Interactive Executive (AIX) operating system.

With the present invention, a block of storage is allocated for use in maintaining privatized data for the processors in the multiprocessor system. For example, a block of storage in the local memory 109 may be allocated for use in maintaining privatized data, hereafter referred to as multiprocessor data (mpdata), for the processors of the multiprocessor system. This block of storage may further be divided into sections, each section containing storage for only a single processor. The sections of the block of storage are preferrably of equal size for each of the processors in the multiprocessor system. Within each section, chunks of mpdata, i.e. 16 bytes of mpdata, may be stored. A range of consecutive chunks of mpdata used as a single mpdata allocation is herein referred to as a region.

Figure 2:
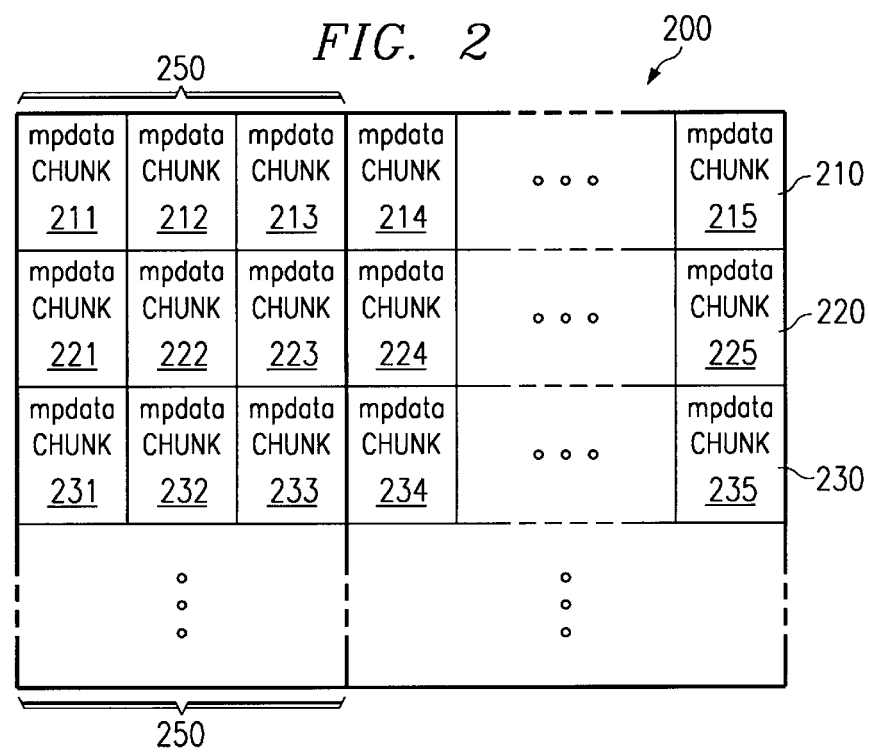
FIG. 2 is a diagram illustrating an mpdata block in accordance with the present invention.

FIG. 2 is a graphical depiction of the block of mpdata according to the present invention. As shown in FIG. 2, the block of mpdata 200 includes a plurality of sections 210–230, each section representing one of the processors in the multiprocessor system. Each of these sections 210–230 is comprised of chunks 211–215 of mpdata. A range of consecutive chunks within a section constitutes a region 250 of the mpdata block 200 that is isomorphic in all the sections 210–230.

The present invention provides an apparatus, method and computer program product for establishing and using this block of storage for maintaining mpdata. The block of storage is in the global address space of the system. Each section is in memory local to the processors, and mpdata chunks are either in memory or cache, depending on use.

The present invention provides new operating system (OS) kernel services for allocating and freeing mpdata storage, new kernel services for accessing mpdata storage regions, and new kernel services for finding isomorphic mpdata regions in the mpdata storage block. In order for the kernel services to be feasible, the kernel service that are used to access the region, e.g., mpdata_get( ), mpdata_getcpu( ), and mpdata_find( ), are able to be called at any time. Specifically, they are able to be called from interrupt handlers and do not make any use of interrupts themselves.

With the present invention, the mpdata_alloc( ) kernel service takes the size, in bytes, needed for a new mpdata region and returns a handle, i.e. a temporary pointer, for the mpdata storage section. The mpdata_free( ) kernel service takes a handle for a previously allocated mpdata storage region, as well as the size of the previously allocated region, and frees the mpdata storage region.

Once allocated, mpdata storage regions can be accessed through the handle of the region using a number of kernel services. First, the mpdata_get( ) kernel service may be used to access the region of a current processor, i.e. the processor on which the kernel that is performing the kernel service is located. Specifically, this kernel service takes the handle of the region as a parameter and returns the effective address of the region for the current processor. Once the effective address has been obtained for a region, the region can be accessed through normal load and store operations.

The mpdata_getcpu( ) kernel service may be used to obtain the effective address of a region for a specified processor, given the handle for the mpdata storage region and a logical processor identifier. The mpdata_find( ) kernel service can be used to find the effective address of the first or next region for a given mpdata storage handle. This kernel service is provided as a convenience and is useful for aggregating values when mpdata storage is used for privatizing statistics data.

The invention will first be described with reference to a 32-bit kernel embodiment which has limited address space. Because of the limited address space, the mpdata implementation of the present invention must only allocate a limited amount of virutal space. This storage space is allocated as needed in fixed-size blocks from the pinned kernel heap. Pinned memory is memory that must remain in physical memory and not be stored in paging space on the disk. The pinned kernel heap is the heap used for memory allocation in the kernel that allocates pinned memory. In a preferred embodiment of the present invention, for example, a block size of 1 kilobyte per processor is used.

Initially, no space is allocated for mpdata storage used. As mpdata storage is allocated, using the mpdata_alloc( ) kernel service, for example, blocks of storage are allocated and added to a linked list of blocks. When a new allocation of mpdata is needed, the mpdata storage allocation application program interface (API) of the present invention searches this linked list for a block that has sufficient free space, using a first-fit algorithm. A new block is added to the linked list if an existing block cannot be found with the needed free space.

The linked list of blocks is maintained through an auxiliary data structure, mpdata_map_t. A mpdata_map_t data structure is allocated for each block from the kernel heap, i.e. the portion of the common pool of free memory available to the kernel to store segments of programs. A block and its auxiliary data structure are freed to the kernel heap when all mpdata storage it represents has been freed.

The mpdata_map_t data structure records the base effective address of the block as well as the allocation state of the chunks within the block. The allocation state is recorded through a bit map and an integer tracking the largest unallocated region available.

Figure 3:
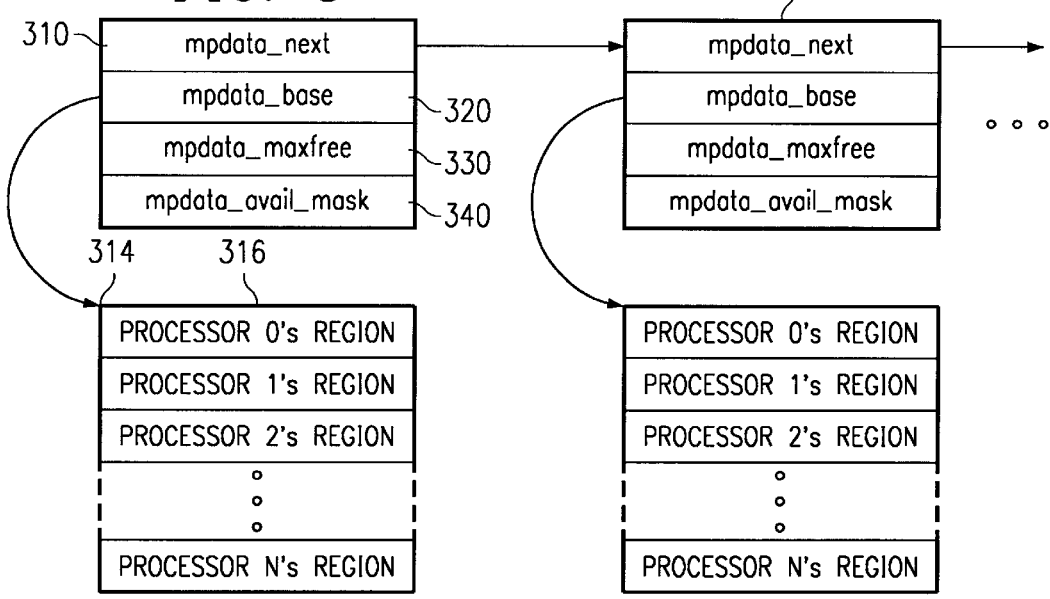
FIG. 3 is a diagram illustrating a linked list data structure in accordance with one embodiment of the present invention.

FIG. 3 is an exemplary diagram illustrating the relationship between a mpdata_map_t structure and the mpdata storage memory block. As shown in FIG. 3, mpdata_next 310 is a pointer to the next member of the linked list 312. mpdata_base 320 is a pointer to the beginning 314 of the corresponding block 316. mpdata_maxfree 330 identifies the length of the longest region of unallocated chunks. mpdata_avail_mask 340 is a bitmask representing the current allocation state.

For example, consider an mpdata storage block of 1 KB which is managed with an internal chunk size of 32 bytes. The block would consist of 32 chunks. If the first, fifth, and twentieth chunks were allocated, the bitmask would be 10001000000000000001000000000000 thereby representing that the current allocation state is that the first, fifth and twentieth chunks have been allocated. This is used to find enough contiguous chunks for an allocation. As described above, each block is partitioned into equal sized sections, one for each processor. Again, these per-processor sections, in a preferred embodiment, are 1 kilobyte. These sections are subdivided into mpdata storage regions that are made up of contiguous chunks of mpdata within per-processor sections.

A single bit in the block allocation map corresponds to N chunks, where N is the maximum number of processors supported by the hardware configuration. The N chunks represented by the single bit are isomorphic chunks in each processor's region. Thus, in FIG. 3, for example, a single bit in the allocation mask (say the fifth bit) would represent the allocation state of the fifth mpdata chunk in processor 0's region, processor 1's region, and so on up to processor N. The offset equation, since the chunks are isomorphic, is:

$$\text{mpdata\_base} + <\text{bit \#}>*<\text{chunk size}> + <\text{cpu \#}>*<\text{cpu offset size; e.g., 1 K}> \quad (1)$$

Each chunk corresponding to a map bit is at the same relative starting byte offset within its per-processor section. This offset can be computed as:

$$\text{Offset} = \text{bit number} * \text{area size (e.g., 16)} \quad (2)$$

The handle returned through mpdata storage allocation is an encoded value, such as a 32-bit value in the preferred embodiment, that allows access to a processor's region. The mpdata storage block is allocated in such a way that the last 12 bits of the starting address will all be 0. Thus, only the top 20 bits are of interest. The last 12 bits are used to store the byte offset. Inherently, the handle can be thought of as being the effective address of processor 0's copy of the mpdata storage region.

With this allocation format, the mpdata_get( ) and mpdata_getcpu( ) kernel services can implement their intended function by returning the effective address of a region of an mpdata storage block simply and efficiently by multiplying the logical processor identifier of the processor of interest (e.g., a current or specified processor) by the per-processor section size (e.g., 1 kilobyte), adding the product to the handle value and returning the result.

$$\text{Effective address} = (\text{CPU id} * \text{section size}) + \text{handle value} \quad (3)$$

In another embodiment of the present invention, a 64-bit kernel is utilized. Because the 64-bit kernel has a much larger address space, virtual space may be pre-allocated and more efficient handle translation may be used. This can be accomplished by allocating a large, fixed-size block of memory for the entire multiprocessor system. This block is split into per-processor sections. In order to make this implementation efficient on a NUMA system, the per-processor sections are placed in memory that is local to the processors. As in the 32-bit kernel, there is a bitmask that tracks the allocation state. The offset is also computed using the same relation, i.e. Eq. (2), as in the 32-bit kernel embodiment.

Due to the large address space of the 64-bit kernel, the mpdata storage technique of the present invention begins at a fixed address. As a result, the handle will be merely the offset from the beginning of the processor section. In order to optimize references to the data, it is optimal to maintain the address of the beginning of each processor's section in a fixed location. Because this value is constant, there are no cache coherency concerns associated with it. This leads to a simple addition of the handle value to this fixed, per-processor value to find the effective address of the processor's mpdata region.

As with the 32-bit kernel embodiment, one bit in the allocation mask refers to N chunks. However, when a mpdata allocation is made, the storage is only pinned for those processors which are online. When new processors are brought online or offline, the storage will be pinned or unpinned, depending on the situation.

Because the amount of mpdata storage used in the 64-bit kernel may become large, searching the bitmask directly may become very inefficient. As a result, a tree structure may be used to search the allocation linked list. In such a tree structure, each node of the tree is provided with a fixed number of children, e.g., four children, and keeps a count of the length of the longest consecutive unused section in each child's subtree. At the bottom of the tree is an allocation bitmask, representing a fixed size region of chunks, which can be quickly searched to find a free region of the right size. The tree structure of the present invention is a variation of a standard binary tree with 4 children at each level instead of two. This means that n bitmasks can be referred to in $\log_b(n)$ levels of the tree, where b is the number of children at each level of the tree.

Figure 4:
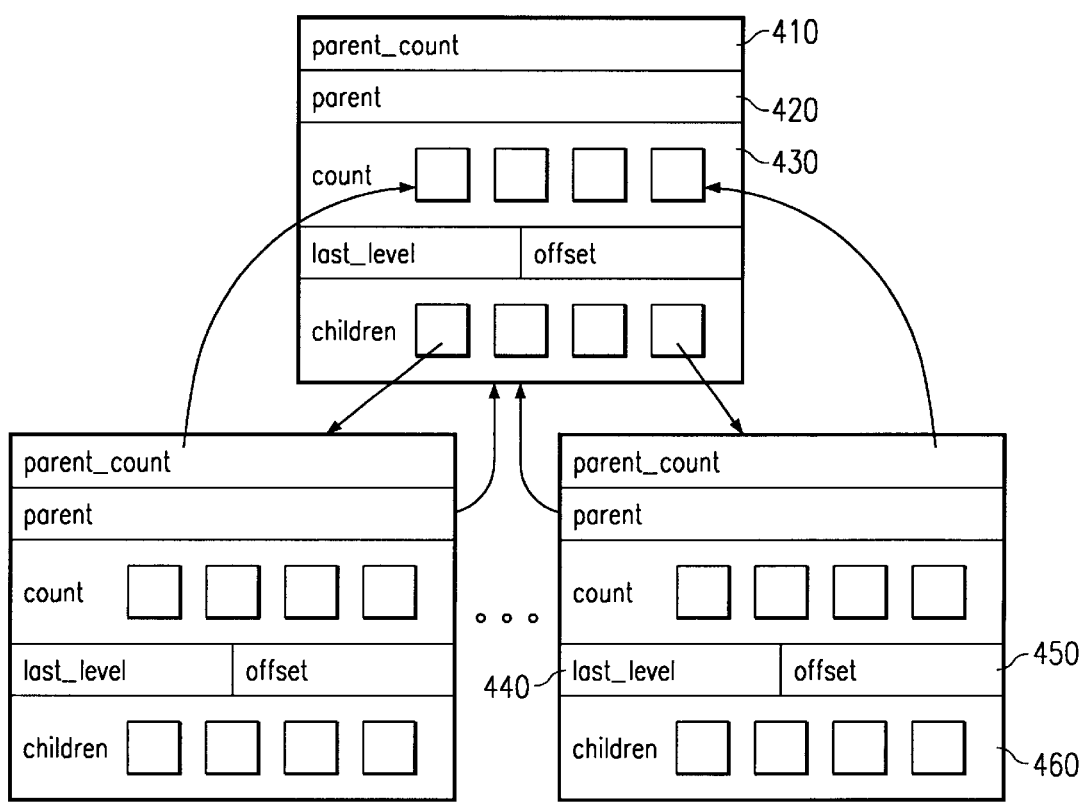
FIG. 4 is a diagram illustrating a portion of a mpdata map tree data structure according to one exemplary embodiment of the present invention.

To create and search this tree, a mpdata_map_tree_t data structure is used. FIG. 4 is an exemplary diagram illustrating a portion of a mpdata_map_tree_t data structure. As shown in FIG. 4, the data structure includes a parent_count 410 that is a pointer into the parent node's count array to the value that refers to this child. The data structure further includes a parent pointer 420 that is a pointer back to the parent node, a count array 430 that records the length of the longest unallocated region in the indexed child's subtree, a last_level bit 440 that denotes whether this is the last tree level or not, an offset 450 that denotes the byte offset of the chunk referenced by the first bit of the bitmask, and a children array 460 that points down the tree to the four subtree structures.

Thus, with the present invention, a storage block is allocated in memory at system initialization time, or on an as needed basis, by using a kernel service that allocates large blocks of memory. The storage block is further divided into identical, smaller, properly aligned storage areas, each dedicated to a single processor in the multiprocessor system.

Additionally, a tree structure representing the allocated storage block is searched every time an mpdata allocation is made. For example, if a 128-byte mpdata region is to be allocated, the tree structure is searched to find a subtree that has 128 contiguous bytes available. Once a subtree is selected, the process is repeated but only considering that child's subtree. This process is repeated until the last_level bit is set, at which point the associated allocation mask is searched to find the region of contiguous bytes, i.e. 128-byte contiguous region.

Figure 5:
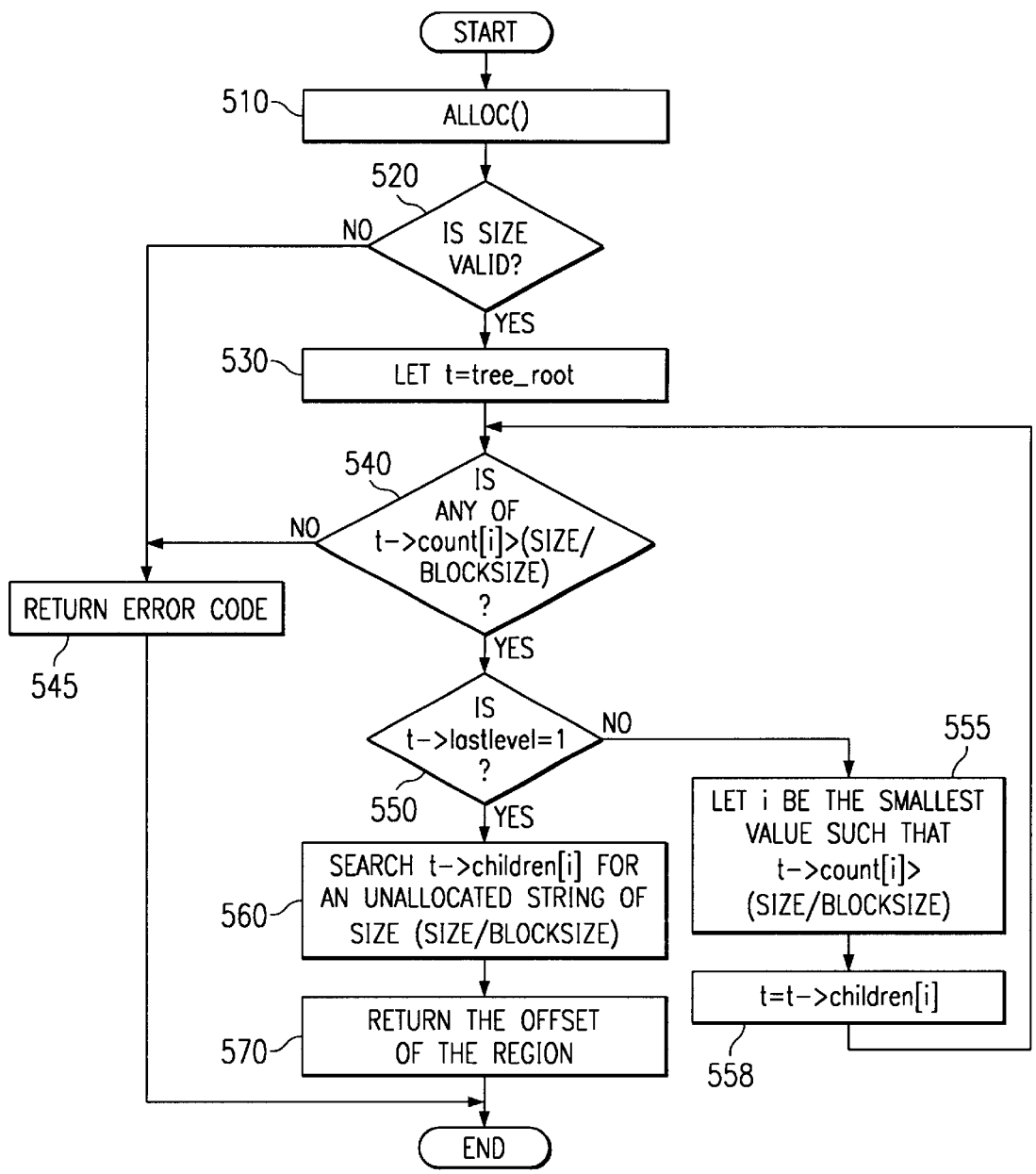
FIG. 5 is a flowchart outlining an exemplary operation of the present invention.

FIG. 5 is a flowchart outlining an exemplary operation of the present invention in accordance with one exemplary embodiment. As shown in FIG. 5, the operation starts with an alloc( ) kernel service being called to determine a necessary size of memory for the mpdata (step 510). A determination is then made as to whether the size of the allocation region is a valid size (step 520). If the size is valid, a search for a node in the mpdata_map_tree_t having enough memory space to store the mpdate is initiated by setting the value of t to the root of the mpdata_map_tree_t (step 530). A determination is then made as to whether the tree has any nodes with a count that is greater than the allocation region size divided by the blocksize (step 540). If not, or if the allocation region size is invalid, an error code is returned (step 545).

If there is any node of the tree having a count that is greater than the allocation region size divided by the blocksize, a determination is made as to whether t points to a lastlevel of the tree (step 550). If so, a search of the children of t is made for an unallocated string having a size large enough to store the allocation region (step 560). The offset for that region is then returned (step 570) and the operation ends.

If t does not point to a last level of the mpdata map tree, the value of i is set to be the smallest possible value such that the count of t is greater than or equal to the allocation region size divided by the blocksize (step 555). The value of t is then reset to the child of t corresponding to i(step 558). The operation then returns to step 540 and repeats until t points to a last level of the mpdata map tree.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of privatizing multiprocessor data for a plurality of processors in a multiprocessor system, comprising:
    allocating a block of memory for storing the multiprocessor data;
    dividing the block of memory into a plurality of sections, each section being for a single processor in the multiprocessor system; and
    storing the multiprocessor data into the plurality of section, where storing the multiprocessor data into the plurality of sections is performed by one or more kernel services.

2. The method of claim 1, wherein each of the plurality of sections are of a same size.

3. The method of claim 1, wherein the block of memory is in a global address space of the multiprocessor system.

4. The method of claim 1, wherein each section of the plurality of sections is in memory local to the processor associated with the section.

5. The method of claim 1, wherein the multiprocessor system is a non-distributed shared memory multiprocessor hardware system.

6. The method of claim 1, wherein the one or more kernel services includes an allocation kernel service that receives as input the size of a region of multiprocessor data and returns a handle for a section to store the region of multiprocessor data.

7. A method of privatizing multiprocessor data for a plurality of processors in a multiprocessor system, comprising:
    allocating a block of memory for storing the multiprocessor data;
    dividing the block of memory into a plurality of sections, each section being for a single processor in the multiprocessor system;
    storing the multiprocessor data into the plurality of sections; and
    accessing the stored multiprocessor data using one or more kernel services.

8. The method of claim 7, wherein the one or more kernel services includes a kernel service for accessing a region of multiprocessor data for a processor on which the kernel service is executed.

9. The method of claim 8, wherein the kernel service for accessing a region of multiprocessor data accepts as input, a handle of the region and returns an effective address of the region for the processor.

10. The method of claim 7, wherein the one or more kernel services includes a kernel service for returning an effective address of a region of multiprocessor data for a processor given a handle of the region and a logical processor identifier.

11. The method of claim 7, wherein the one or more kernel services includes a kernel service for finding an effective address for a given multiprocessor storage region handle.

12. A method of privatizing multiprocessor data for a plurality of processors in a multiprocessor system, comprising:
    allocating a block of memory for storing the multiprocessor data;
    dividing the block of memory into a plurality of section, each section being for a single processor in the multiprocessor system;
    storing the multiprocessor data into the plurality of sections; and
    adding the block of memory to a linked list of blocks of memory.

13. The method of claim 12, wherein storing the multiprocessor data includes searching the linked list for a block that has sufficient free space to store the multiprocessor data.

14. The method of claim 12, wherein the linked list is maintained through an auxiliary data structure.

15. The method of claim 14, wherein the auxiliary data structure records base effective addresses for blocks of memory and an allocation state of chunks of multiprocessor data within the blocks.

16. The method of claim 15, wherein the allocation state of chunks of multiprocessor data is recorded using a block allocation bitmap wherein each bit in the block allocation bitmap represents N chunks of multiprocessor data.

17. The method of claim 16, wherein each chunk of multiprocessor data corresponding to a bit in the block allocation bitmap is at a same relative starting byte offset within a corresponding section of a block of memory.

18. The method of claim 13, wherein searching the linked list includes using a tree structure to search the linked list.

19. The method of claim 18, wherein each node of the tree structure has a fixed number of child nodes, and wherein the tree structure has an allocation bitmask at a bottom of the tree structure representing a fixed size region of chunks of multiprocessor data.

20. An apparatus for privatizing multiprocessor data for a plurality of processors in a multiprocessor system, comprising:
    means for allocating a block of memory for storing the multiprocessor data;

means for dividing the block of memory into a plurality of sections, each section being for a single processor in the multiprocessor system; and means or storing the multiprocessor data into the plurality of sections, wherein the means for storing the multiprocessing data into the plurality of sections includes one or more kernel services.

21. A computer program product in a computer readable medium for privatizing multiprocessor data for a plurality of processors in a multiprocessor system, comprising:

first instructions for allocating a block of memory for storing the multiprocessor data;

second instructions for dividing the block of memory into a plurality of sections, each section being for a single processor in the multiprocessor system; and third instructions for storing the multiprocessor data into the plurality of sections, wherein the third instructions include one or more kernel services.

22. The computer program product of claim 21, wherein each of the plurality of sections are of a same size.

23. The computer program product of claim 21, wherein the block of memory is in a global address space of the multiprocessor system.

24. The computer program product of claim 21, wherein each section of the plurality of sections is in memory local to the processor associated with the section.

25. The computer program product of claim 21, wherein the one or more kernel services includes an allocation kernel service that receives as input the size of a region of multiprocessor data and returns a handle for a section to store the region of multiprocessor data.

26. An apparatus for privatizing multiprocessor data for a plurality of processors in a multiprocessor system, comprising:

means for allocating a block of memory for storing the multiprocessor data;

means for dividing the block of memory into a plurality of sections, each section being for a single processor in the multiprocessor system;

means for storing the multiprocessor data into the plurality of sections; and means for accessing the stored multiprocessor data using one or more kernel services.

27. A computer program product in a computer readable medium for privatizing multiprocessor data for a plurality of processors in a multiprocessor system, comprising:

first instructions for allocating a block of memory for storing the multiprocessor data;

second instructions for dividing the block of memory into a plurality of sections, each section being for a single processor in the multiprocessor system;

third instructions for storing the multiprocessor data into the plurality of sections; and fourth instructions for accessing the stored multiprocessor data using one or more kernel services.

28. The computer program product of claim 27, wherein the one or more kernel services includes a kernel service for accessing a region of multiprocessor data for a processor on which the kernel service is executed.

29. The computer program product of claim 28, wherein the kernel service for accessing a region of multiprocessor data accepts as input, a handle of the region and returns art effective address of the region for the processor.

30. The computer program product of claim 27, wherein the one or more kernel services includes a kernel service for returning an effective address of a region of multiprocessor data for a processor given a handle of the region and a logical processor identifier.

31. The computer program product of claim 27, wherein the one or more kernel services includes a kernel service for finding an effective address for a given multiprocessor storage region handle.

32. A computer program product in a computer readable medium for privatizing multiprocessor data for a plurality of processors in a multiprocessor system, comprising:

first instructions for allocating a block of memory for storing the multiprocessor data;

second instructions for dividing the block of memory into a plurality of sections, each section being for a single processor in the multiprocessor system;

third instructions for storing the multiprocessor data into the plurality of sections; and fourth instructions for adding the block of memory to a linked list of blocks of memory.

33. The computer program product or claim 32, wherein the third instructions include instructions for searching the linked list for a block that has sufficient free space to store the multiprocessor data.

34. The computer program product of claim 32, wherein the linked list is maintained through an auxiliary data structure.

35. The computer program product of claim 34, wherein the auxiliary data structure records base effective addresses for blocks of memory and an allocation state of chunks of multiprocessor data within the blocks.

36. The computer program product of claim 35, wherein the allocation state of chunks of multiprocessor data is recorded using a block allocation bitmap wherein each bit in the block allocation bitmap represents N chunks of multiprocessor data.

37. The computer program product of claim 36, wherein each chunk of multiprocessor data corresponding to a bit in the block allocation bitmap is at a same relative starting byte offset within a corresponding section of a block of memory.

38. The computer program product of claim 33, wherein the instructions for searching the linked list include instructions for using a tree structure to search the linked list.

39. The computer program product of claim 38, wherein each node of the tree structure has a fixed number of child nodes, and wherein the tree structure has an allocation bitmask at a bottom of the tree structure representing a fixed size region of chunks of multiprocessor data.

40. An apparatus for privatizing multiprocessor data for a plurality of processors in a multiprocessor system, comprising:

means for allocating a block of memory for storing the multiprocessor data;

means for dividing the block of memory into a plurality of sections, each section being for a single processor in the multiprocessor system;

means for storing the multiprocessor data into the plurality of sections; and means for adding the block of memory to a linked list of blocks of memory.

* * * * *

UNITED STATES PATENT AND TRADEMARK OFFICE
CERTIFICATE OF CORRECTION

PATENT NO.     : 6,754,788 B2
DATED          : June 22, 2004
INVENTOR(S)    : Mathews et al.

It is certified that error appears in the above-identified patent and that said Letters Patent is hereby corrected as shown below:

Column 8,
Line 34, after "plurality of" delete "section," and insert -- sections, --.

Column 9,
Line 62, after "returns" delete "art" and insert -- an --.

Column 10,
Line 22, after "product" delete "or" and insert -- of --.

Signed and Sealed this

Twenty-seventh Day of September, 2005

JON W. DUDAS
*Director of the United States Patent and Trademark Office*